La V. W. NOYES.
Horse Hay-Fork.
No. 199,378. Patented Jan. 22, 1878.
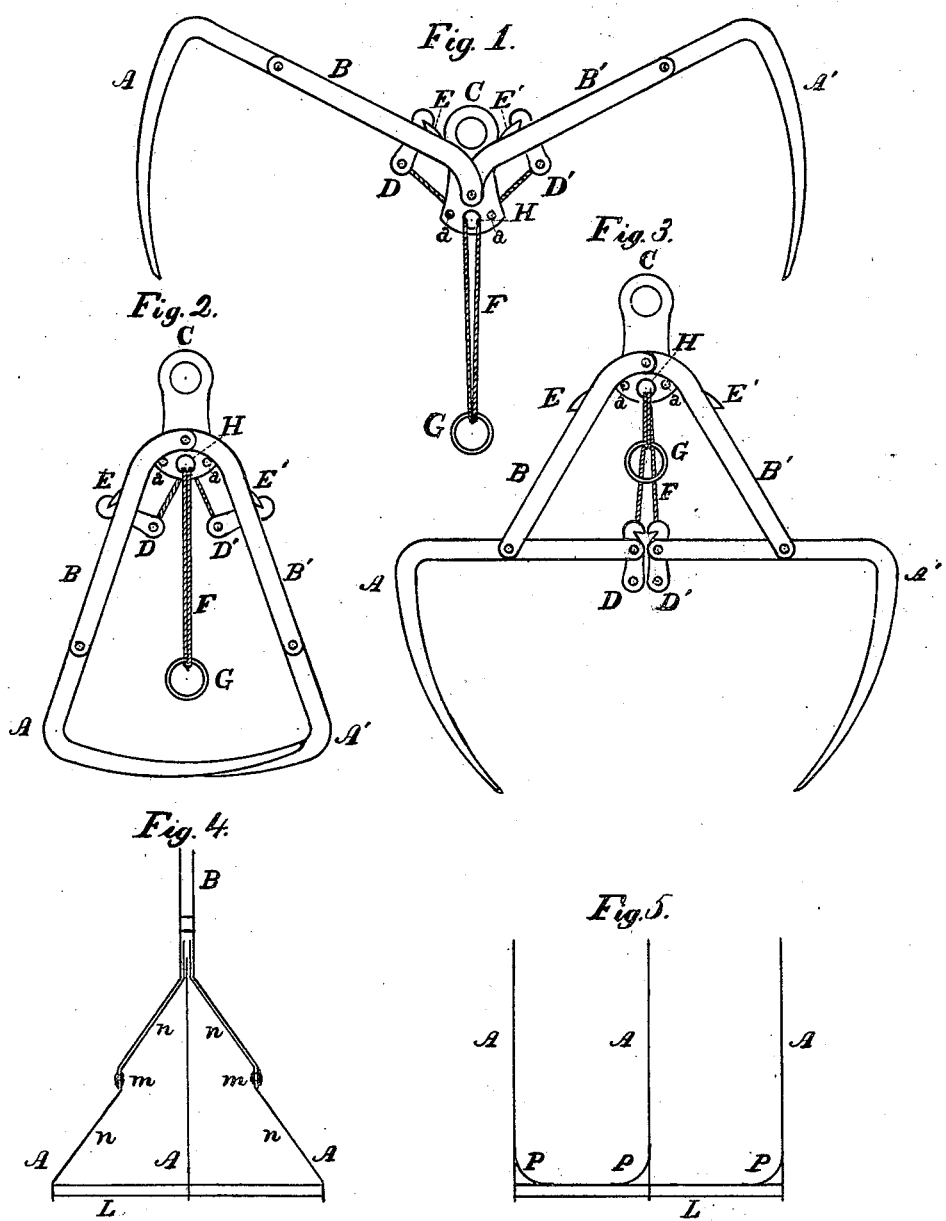
Attest:
Wm H. Burnham
D. Halladay
Inventor:
LaVerne W. Noyes

UNITED STATES PATENT OFFICE.

LA VERNE W. NOYES, OF BATAVIA, ILLINOIS.

IMPROVEMENT IN HORSE HAY-FORKS.

Specification forming part of Letters Patent No. 199,378, dated January 22, 1878; application filed October 20, 1877.

*To all whom it may concern:*

Be it known that I, LA VERNE W. NOYES, of Batavia, in the county of Kane and State of Illinois, have invented a new and useful Improvement in Horse Hay-Forks, which improvement is fully set forth in the following specification and accompanying drawing, in which—

Figure 1 is a side elevation of the fork, showing it spread ready to be thrust into the hay. Fig. 2 is a similar view, showing the fork in the form which it has a tendency to assume when a forkful of hay is being elevated. Fig. 3 is also a similar view, and shows the fork in the form which it assumes when a forkful is discharged. Fig. 4 is an end elevation of a portion of the fork. Fig. 5 is a horizontal section, showing the portion of the tines of the fork which enters the hay, with the parts adjacent to them.

The object of my invention is to furnish a device for seizing and holding hay, straw, and other loose and fibrous material, and to discharge the same when desired.

In the drawing, A and A' are tines, which grapple toward each other. They are hinged on the outer or free ends of the bails B and B', while the upper or straight ends of the tines carry vibrating catches D and D', which engage with the stops E and E', which stops are firmly fixed in the bails B and B'. By this arrangement the tines A and A' are held rigid with the bails B and B', when the catches D and D' are engaged with the stops E and E'; but when said catches are disengaged from said stops the tines are free to vibrate on the rivets $m\ m$. (Shown in Fig. 4.) The ends of the rope F are attached to the inner ends of the catches D and D', and the middle portion of said rope passes through a support, H, which is nearer the point where the bails B and B' are hinged than the catches are. The discharge-rope is attached to the middle portion of the rope F, in order that both of the catches may be disengaged at the same instant.

The discharge-rope and the rope F are best fastened together by means of a ring or loop, G, through which the rope F passes, and to which the discharge-rope is attached.

The bails B and B' are hinged together in the middle, or to a head, C, in such a manner that they will vibrate freely in one direction, but admit of no lateral motion. On this movable head C there are two shoulders, $a\ a$, and in the upper end of the head C there is a hole or loop, in which the rope or pulley is secured by means of which the fork is handled.

In Fig. 4 a short portion of the outer tines, between the oblique parts $n\ n\ n\ n$, are kinked or bent, so as to be parallel to the plane of vibration, and a portion of the bail is similarly bent and riveted flatly onto the tine at this point, these rivets $m\ m$ forming the bearings on which the tines are hinged.

In Fig. 5 are shown the braces P P P, which join the points of the tines to the girt or sill L.

In actual operation the fork is put down on the hay in the form shown in Fig. 1, and the tines are thrust into the hay, turning on the rivet which hinges the bails together. When the fork is raised up with the forkful of hay is has a tendency to gravitate into the shape shown in Fig. 2, and grapples the hay between the two sets of tines which are opposed to each other, and holds it securely until it is conveyed to its destination, when a jerk on the discharge-rope attached to the rope F detaches the catches D and D' from the stops E and E'; then the weight of the hay on the points of the tines causes the hay to be dropped and the tines to assume the form shown in Fig. 3. Another pull on the discharge-rope causes the fork again to assume the shape shown in Fig. 2, and the bails rest on the shoulders $a\ a$.

By the arrangement shown in Fig. 4 the tines are hinged into the bails in a very simple, cheap, and convenient manner, and are held very securely, the rivets $m\ m$ allowing no lateral movement. In Fig. 5 the braces P P P are to stiffen the points of the tines and prevent lateral movement.

Tines of much greater length can be used when strengthened with braces or brackets than without such strengthening. A curved brace or bracket is preferable, as it enables the tine to enter the hay more easily, and in practice would generally be used.

I do not wish to confine my devices to a fork with three tines on a side, for it is obvious that a greater or less number of tines can be used in the same way.

Having thus described my invention, what I claim as new, and desire to secure by Letters Patent, is—

1. The tines A and A', carrying the vibrating catches D and D', in combination with the stops E and E' and the bails B and B', hinged together, as shown and described.

2. In combination with the tines A and A', carrying the vibrating catches D and D', the bails B and B', hinged together, and the stops E and E', the movable head C, substantially as shown and described.

3. In a hay-fork, the movable head C, with shoulders $a\ a$, serving as stops for the bails, substantially as shown and described, and for the purpose herein set forth.

4. The rope F and the guide or support H, in combination with the vibrating catches D and D', the stops E and E', the bails B and B', and the tines A and A', all arranged substantially as shown and described, and for the purpose herein set forth.

LA VERNE W. NOYES.

Witnesses:
GEO. O. SPOONER,
H. N. WADE.